(12) United States Patent
Taguchi et al.

(10) Patent No.: US 8,704,981 B2
(45) Date of Patent: Apr. 22, 2014

(54) METHOD OF PRODUCING LIGHT-REFLECTIVE FILM

(75) Inventors: Takao Taguchi, Kanagawa (JP); Kazuhiro Oki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 214 days.

(21) Appl. No.: 13/428,677

(22) Filed: Mar. 23, 2012

(65) Prior Publication Data

US 2012/0242948 A1 Sep. 27, 2012

(30) Foreign Application Priority Data

Mar. 25, 2011 (JP) ................................. 2011-068453

(51) Int. Cl.
*G02F 1/13* (2006.01)
*G02F 1/1335* (2006.01)
*G02B 5/26* (2006.01)

(52) U.S. Cl.
USPC ............................ 349/115; 349/187; 349/191

(58) Field of Classification Search
USPC ............... 349/115, 176, 187, 191; 252/299.7; 427/508; 430/321
See application file for complete search history.

(56) References Cited

U.S. PATENT DOCUMENTS

2012/0050847 A1* 3/2012 Watanabe ..................... 359/352

FOREIGN PATENT DOCUMENTS

| JP | 2003-084284 | 3/2003 |
| JP | 2003-221463 | 8/2003 |
| JP | 2007-072262 | 3/2007 |
| JP | 2010-286643 | 12/2010 |

\* cited by examiner

*Primary Examiner* — Dung Nguyen
*Assistant Examiner* — Tai Duong
(74) *Attorney, Agent, or Firm* — Young & Thompson

(57) ABSTRACT

Provided is a method of producing a light-reflective film that can prevent the blocking of a liquid crystal layer and a support without lowering transparency of the film.
The method includes a step of coating a curable liquid crystal composition that contains a curable cholesteric liquid crystal compound onto one surface of a support of which a surface roughness Ra of the other surface thereof is 4.5 nm to 25 nm; a step of aligning the curable cholesteric liquid crystal compound to make a state of a cholesteric liquid crystal phase aligned by heating the coated curable liquid crystal composition; a step of irradiating in which a light-reflecting layer where the cholesteric liquid crystal phase has been fixed is formed by advancing a curing reaction of the curable liquid crystal composition; and a step of charging the support and the light-reflecting layer with the same polarity.

18 Claims, 4 Drawing Sheets

METHOD OF PRODUCING LIGHT-REFLECTIVE FILM

BACKGROUND OF THE INVENTION

1. Field of the Invention

The present invention relates to a method of producing a light-reflective film. More specifically, the present invention relates to a method of producing a light-reflective film that includes a light-reflecting layer in which a cholesteric liquid crystal phase has been fixed.

2. Description of the Related Art

In recent years, as interest in the environment and energy has been heightened, the need for industrial products relating to energy saving has been increased. As one of the industrial products, a heat-shielding product for window glass of houses or automobiles, that is, a light-reflective film for glass that has an effect of reducing a thermal load caused by sunlight is in demand.

As eco-glass having a high insulating and heat-shielding property, a multi-layered glass coated with a special metallic film that blocks radiant heat, which is called Low-E pair glass, is widely used. The special metallic film can be prepared by laminating a plurality of layers by, for example, a vacuum film-forming method. However, the productivity of the vacuum process is low, and the production cost thereof is high. Moreover, in many cases, the light-reflective film for glass is required to transmit light of a wavelength other than the target reflection wavelength due to the use thereof. For example, for automobile windows, the light-reflective film is required to have a property of reflecting infrared light but reliably transmitting visible light, from the viewpoint of safety. In addition, the light-reflective film is required to accomplish a high transparency (haze reduction or the like). However, when the metallic film is used, the high transparency is not necessarily satisfied. Moreover, other improvements are required for the light-reflective film, from the viewpoint of a radio wave-transmitting property or the like.

In this respect, an infrared light-reflecting film obtained by laminating a layer in which a curable cholesteric liquid crystal phase has been fixed (hereinafter, also referred to as a "cholesteric liquid crystal layer" in some cases) on a support has been suggested (for example, see JP2010-286643A). As a method of laminating a plurality of cholesteric liquid crystal layers, JP2010-286643A discloses a method of drying coating films containing cholesteric liquid crystal materials, aligning the coating films by heating, followed by ultraviolet curing, and laminating the coating films layer by layer. However, JP2010-286643A does not disclose a step of finally winding up the light-reflective film in which the cholesteric liquid crystal layers have been laminated and does not disclose the characteristics of the light-reflective film wound up. Moreover, JP2010-286643A does not disclose continuously laminating the cholesteric liquid crystal layers layer by layer while transporting the support when the coating film containing the cholesteric liquid crystal materials is dried, aligned by heating, and cured with ultraviolet. JP2010-286643A also does not disclose a production method including winding up once the coating film containing the cholesteric liquid crystal materials at a point of time when one layer of the coating film has been layered, when the cholesteric liquid crystal layers are continuously laminated.

SUMMARY OF THE INVENTION

The present inventors continuously produced a light-reflective film in which a support and curable cholesteric liquid crystal layers are laminated, with reference to the method disclosed in JP2010-286643A. At this time, they found that a blocking problem arose when the light-reflective film was wound up during the production process or at the final stage.

Hitherto, a problem has been known in the related art. That is, generally, if a film is wound up during a molding process or stored while being wound, or if a large number of films is laminated in the subsequent secondary process, the films block each other, which makes it difficult to peel the films (for example, see JP2003-221463A). As a countermeasure against this problem, JP2003-221463A discloses a method of adding a slipping agent that imparts a slipping property to a polyethylene-based resin film. However, in the method of using the slipping agent, there is a concern that bleeding from the film will be caused. The present inventors continuously produced a light-reflective film in which a support and curable cholesteric liquid crystal layers are laminated, by using the slipping agent. At this time, they found that the slipping agent was transferred to the curable cholesteric liquid crystal layer from the support, and that the alignment of liquid crystals became defective due to the transferring of the slipping agent. If the alignment of liquid crystals becomes defective in this way, the haze of the light-reflective film increases, which causes problems in transparency.

Meanwhile, as a method of reducing the defectiveness caused by the liquid crystal alignment of the film in which a resin film and a liquid crystal layer are laminated, for example, JP2003-84284A discloses a method of reducing the defectiveness of the liquid crystal alignment resulting from asperities by planarizing the surface of a polymer film used as an alignment-supporting substrate by means of polishing the surface. However, when the present inventors continuously produced a light-reflective film in which curable cholesteric liquid crystal layers are laminated, by using a support of which the surface roughness has been reduced, they found that blocking was more easily caused. In addition, though disclosing a step of continuously producing a light-reflective film in which cholesteric liquid crystal layers are laminated and winding up the film, JP2007-72262A makes no mention of the blocking problem.

That is, an object of the present invention is to provide a method of producing a light-reflective film that can prevent the blocking of a liquid crystal layer and a support without lowering transparency of the film.

In the field of a film in which liquid crystal layers are laminated (particularly, in the field using cholesteric liquid crystal layers), from various viewpoints, for example, for the purpose of preventing dust from being attached to the film or preventing static failure, antistatic treatment is performed in general. As a method of the antistatic treatment, for example, providing an antistatic layer is known. In addition, JP2003-84284A discloses a method of removing static electricity caused when a resin film is polished.

Based on these circumstances, the present inventors conducted a thorough investigation to achieve the above object. As a result, they found that the above object can be achieved by controlling the surface roughness of a support surface (back surface of a support) where the cholesteric liquid crystal layer is not formed within a specific range and by forming a film while charging the back surface of the support and the outermost layer of the liquid crystal layer with the same polarity after a liquid crystal material is coated and the liquid crystal layer is cured (preferably, the back surface of the support and the outermost layer of the liquid crystal layer are charged with the same polarity only immediately before the film is wound up, and more preferably, the electric charges of the back surface and the outermost layer are removed in other steps), contrary to the general idea in the related art regarding the prevention of static charge of a liquid crystal layer.

According to an embodiment of the present invention, a method of producing a light-reflective film includes a step of coating a curable liquid crystal composition that contains a curable cholesteric liquid crystal compound onto one surface of a support of which a surface roughness Ra of the other surface of the support is 4.5 nm to 25 nm; a step of aligning the curable cholesteric liquid crystal compound to make a state of a cholesteric liquid crystal phase aligned by heating the coated curable liquid crystal composition; a step of irradiating in which a light-reflecting layer being fixed the cholesteric liquid crystal phase is formed by advancing a curing reaction of the curable liquid crystal composition; and a step of charging the support and the light-reflecting layer with the same polarity.

Preferably, the method further includes a step of winding up a laminate of the support and the light-reflecting layer.

More preferably, the step of charging the support and the light-reflecting layer with the same polarity includes a step of bringing both surfaces of the laminate of the support and the light-reflecting layer into contact with a pass roll at least once.

More preferably, the pass roll contains, on the surface of the pass roll, a material in a triboelectric series that shows an electrical polarity opposite to the electrical polarity of both the support and the light-reflecting layer.

More preferably, the step of charging the support and the light-reflecting layer with the same polarity includes a step of bringing at least one surface of the laminate of the support and the light-reflecting layer into contact with a charged pass roll.

More preferably, the pass roll is a rubber roll, a urethane roll, a hard chrome-plated roll, or an aluminum coating roll.

More preferably, the method further includes a step of repeating a set of steps, wherein the set of steps comprises a step of feeding out the light-reflective film obtained after the step of winding up according to Claim 2, the step of coating the curable liquid crystal composition that contains the curable cholesteric liquid crystal compound onto the surface of the light-reflecting layer, the step of aligning the curable cholesteric liquid crystal compound to make a state of a cholesteric liquid crystal phase aligned by heating the coated curable liquid crystal composition, the step of irradiating in which the light-reflecting layer being fixed the cholesteric liquid crystal phase is formed by advancing a curing reaction of the curable liquid crystal composition, the step of charging the support and the light-reflecting layer with the same polarity, and the step of winding up a laminate of the support and the light-reflecting layer.

More preferably, the curable liquid crystal composition contains at least a rod-shaped polymerizable cholesteric liquid crystal compound as the curable cholesteric liquid crystal compound, and contains an alignment-controlling agent, a solvent, and a chiral agent.

More preferably, as the light-reflecting layer, at least one layer that reflects right-circularly polarized light and at least one layer that reflects left-circularly polarized light are formed respectively.

More preferably, the support contains a polyethylene terephthalate film.

More preferably, the surface roughness of the other surface of the support is controlled to 4.5 nm to 25 nm by laminating a matting agent-containing layer, a microwave plasma treatment, or kneading the matting agent into the support.

More preferably, the amount of the matting agent added to the support is 15% by mass or less.

More preferably, the method produces a light-reflective film for being attached to a window or for laminated glass.

According to the present invention, a light-reflective film can be provided which can prevent blocking of the liquid crystal layer and the support while maintaining an excellent transparency of the film.

DESCRIPTION OF THE PREFERRED EMBODIMENTS

Figure 1:
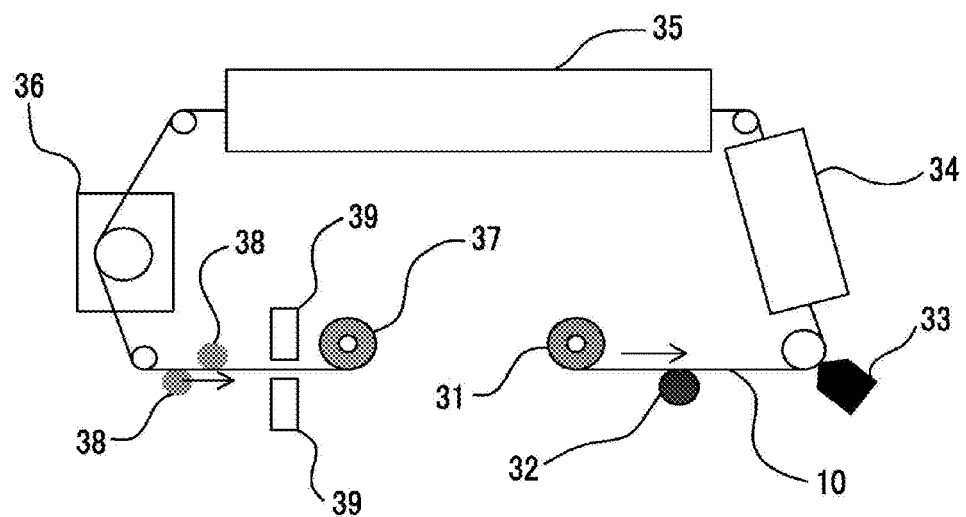
FIG. 1 is a schematic view showing an example of a production apparatus used in the production method of the present invention.
Figure 2:
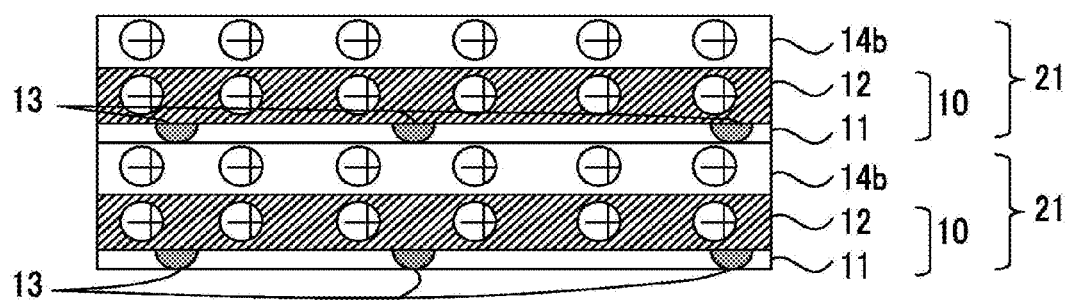
FIG. 2 is a schematic view showing an exemplary cross-section of an infrared light-reflective film produced by the production method of the present invention.

Hereinbelow, the content of the present invention will be described in detail. The following constituent elements will be described based on a representative embodiment of the present invention, but the present invention is not limited thereto. In addition, in the specification of the present application, "to" means that numerical values described before and after this sign indicate a lower limit and an upper limit. Moreover, in the present specification, a polymerizable group refers to a photo-polymerized functional group such as an acrylate group, a methacrylate group, or the like.

[Method of Producing Light-Reflective Film]

The method of producing a light-reflective film of the present invention includes a step of coating a curable liquid crystal composition that contains a curable cholesteric liquid crystal compound onto one surface of a support of which a surface roughness of the other surface thereof is 4.5 nm to 25 nm; a step of aligning the curable cholesteric liquid crystal compound to make a state of a cholesteric liquid crystal phase aligned by heating the coated curable liquid crystal composition; a step of irradiating in which a light-reflecting layer where the cholesteric liquid crystal phase has been fixed is formed by advancing a curing reaction of the curable liquid crystal composition; and a step of charging the support and the light-reflecting layer with the same polarity. In addition, the method of producing a light-reflective film of the present invention is also referred to as a production method of the present invention.

Hitherto, the blocking of a film has been considered to be caused by intermolecular forces resulting from fluorine, oxygen, or nitrogen atoms existing on the film surface or caused by adhesion resulting from hydrogen bonds. Though not adhering to any of the theories, the production method of the present invention can reduce the area where the films adhere to each other by a synergy effect between appropriate surface asperities of a film and electrical repulsion between both surfaces of the film, and can widen the inter-atomic distance on the film surface. Consequently, the production method of the present invention can prevent adhesion caused by the intermolecular forces between atoms or by hydrogen bonds, and can inhibit the blocking. In addition, according to the production method of the present invention, appropriate surface asperities are provided to the support, so the above-described blocking inhibiting effect is obtained. Therefore, since the transparency of the light-reflective film is not lowered due to the addition of a large amount of additives such as a slipping agent to the film, a light-reflective film with a high transparency can be produced. The surface asperities of the support that are required in the present invention can be obtained by adding inorganic fine particles, and the surface asperities can be obtained by adding the particles at an extremely small amount that almost does not negatively influence the transparency.

Hereinbelow, the method of producing a light-reflective film of the present invention will be described in order of materials and devices that are preferably used in the each step.

(Support)

The support used in the method of producing a light-reflective film of the present invention is not particularly limited as long as the surface roughness of one surface of the support is 4.5 nm to 25 nm. The light-reflective film can be produced by coating a light-reflecting layer onto an arbitrary support. As the support, for example, a polymer film, a glass plate, a quartz plate, or the like can be used, and among these, a polymer film showing a high visible light transmittance is preferably used.

Examples of the polymer film showing a high visible light transmittance includes various polymer films for optical films that are used as members of display devices such as a liquid crystal display device. As the polymer films for optical films, for example, polyester films such as polyethylene terephthalate (PET), polybutylene terephthalate, and polyethylene naphthalate (PEN); a polycarbonate (PC) film; a polymethyl methacrylate film; polyolefin films such as polyethylene and polypropylene; a polyimide film; a triacetyl cellulose (TAC) film, and the like are preferable. Among these, polyethylene terephthalate and triacetyl cellulose are more preferable, and polyethylene terephthalate is particularly preferable.

The surface roughness of one surface of the support is preferably 6 nm to 20 nm, and more preferably 8 nm to 15 nm. On the other hand, the surface roughness of the other surface of the support is not particularly limited as long as the surface roughness does not go against the purpose of the present invention, so it is not necessary to control the surface roughness. Here, when a liquid crystal layer is provided as the light-reflecting layer, it is preferable to reduce the surface roughness, from the viewpoint of making it possible to reduce the haze of the obtained light-reflective film by causing the liquid crystal layer to be excellently aligned.

The support may be produced by an arbitrary method, or commercially available products can be used as the support. When a support having a surface roughness out of a range of from 4.5 nm to 25 nm is used, the surface roughness of one surface of the support may be controlled to 4.5 nm to 25 nm.

The production method of the present invention preferably includes a step of controlling the surface roughness of the other surface of the support to 4.5 nm to 25 nm. There is no particular limitation on a method of controlling the surface roughness of one surface of the support to 4.5 nm to 25 nm, and known methods can be used. For example, methods that control the surface roughness by laminating the support with a matting agent-containing layer, by performing a microwave plasma treatment on the support surface, or by kneading the matting agent into the support material can be exemplified. Among these, the laminating of the matting agent-containing layer or the microwave plasma treatment is preferable from the viewpoint of improving the transparency of the obtained film. Moreover, the laminating of the matting agent-containing layer is preferable from the viewpoint of facilitating charging in the step of charging described later.

(Matting Agent)

The support preferably contains a matting agent from the viewpoints of imparting an excellent film-sliding property to the support and producing films stably. The matting agent may be a matting agent of an inorganic compound or an organic compound. Among these, a matting agent of an inorganic compound is preferable from the viewpoint of further facilitating charging in the step of charging described later.

Preferable specific examples of the matting agent of an inorganic compound include inorganic compounds containing silicon (for example, silicon dioxide, calcined calcium silicate, calcium silicate hydrate, aluminum silicate, magnesium silicate, and the like), titanium oxide, zinc oxide, aluminum oxide, barium oxide, zirconium oxide, strontium oxide, antimony oxide, tin oxide, tin/antimony oxide, calcium carbonate, talc, clay, calcined kaolin, calcium phosphate, and the like. More preferable examples include silicon-containing inorganic compounds and zirconium oxide. Silicon dioxide is particularly preferably used, from the viewpoints that the decrease in the transparency is small and that the support and the liquid crystal layer are easily charged with the same polarity in the step of charging described later. As fine particles of the silicon dioxide, for example, commercially available products having product names such as Aerosil R972, R974, R812, 200, 300, R202, OX50, and TT600 (all manufactured by Nippon Aerosil Co., Ltd.) can be used. As fine particles of the zirconium oxide, for example, commercially available products having product names such as Aerosil R976 and R811 (all manufactured by Nippon Aerosil Co., Ltd.) can be used.

Preferable specific examples of the matting agent of an organic compound include polymers such as a silicone resin, a fluororesin, and an acrylic resin, and among these, a silicone resin is preferably used. Among silicone resins, those having a three-dimensional reticular structure are preferable, and for example, commercially available products having product names such as Tospearl 103, Tospearl 105, Tospearl 108, Tospearl 120, Tospearl 145, Tospearl 3120, and Tospearl 240 (all manufactured by GE Toshiba Silicones Co., Ltd.) can be used.

When the matting agent is added to the support, a matting agent-containing layer may be newly laminated on one surface of the polymer film, the glass plate, the quartz plate (preferably, a polymer film showing a high visible light transmittance) or the like as the support so as to prepare a support including a plurality of layers constituted with layers containing and not containing the matting agent. In addition, the matting agent may be kneaded into the polymer film, the glass plate, the quartz plate, or the like as the support so as to prepare a single-layered support in which the matting agent is dispersed in the whole support. Among these, it is preferable to prepare a support including a plurality of layers constituted with layers containing and not containing the matting agent by newly laminating the matting-agent containing layer, from the viewpoints that the transparency can be improved since a desired surface roughness can be achieved with a small amount of the matting agent added, and that the support including a plurality of layers can prevent the alignment of the liquid crystal layer from being negatively influenced by the increase in the surface roughness of the surface where the liquid crystal layer is laminated.

In the production method of the present invention, the amount of the matting agent added is preferably 15% by mass or less, more preferably 3% by mass to 13% by mass, and particularly preferably 5% by mass to 10% by mass, based on the support (all of the plurality of layers of the support including layers containing and not containing the matting agent, or the single-layered support in which the matting agent is dispersed in the whole support). When the support is the support including a plurality of layers constituted with layers containing and not containing the matting agent, the amount of the matting agent added to the layer containing the matting agent is preferably 30% by mass or less, more preferably 6% by mass to 26% by mass, and particularly preferably 10% by mass to 20% by mass, based on the layer containing the matting agent. If the matting agent is added in this amount, the haze of the light-reflective film obtained by the production method of the present invention can be sufficiently reduced, and the surface roughness of one surface of the support can be controlled within a desired range.

Any method can be used as the method of forming the matting agent-containing layer or the method of kneading the matting agent into the support material, without limitation. For example, as the method of forming the matting agent-containing layer, a method is preferable in which a dispersion obtained by dispersing the matting agent in an arbitrary aqueous latex dispersion is coated onto the layer not containing the matting agent and dried to form a film. Moreover, when the single-layered support in which the matting agent is dispersed in the whole support is used, it is preferable to form a film by melting and extruding a material that is obtained by adding the matting agent in advance to a master pellet.

It is preferable to install a screw kneader online to prepare the dispersion in which the matting agent is dispersed. Specifically, it is preferable to prepare the dispersion by using a static mixer such as an in-line mixer. As the in-line mixer, for example, a static mixer SWJ (Toray static in-tube mixer Hi-Mixer) (manufactured by Toray Engineering Co., Ltd) is preferable.

(Microwave Plasma Treatment)

In the production method of the present invention, as a step of controlling the surface roughness of one surface of the support to 4.5 nm to 25 nm, a microwave plasma treatment can be used. As a preferable embodiment of the microwave plasma treatment, the following embodiment can be exemplified.

One surface of the support is treated by the following conditions.

Apparatus: BH-10 (NISSIN. Inc),
Frequency: 2.45 GHz,
Output power: 1000 W,
Treatment time: 1 minute,
Process gas: N2.

(Step of Coating)

The production method of the present invention includes a step of coating a curable liquid crystal composition that contains a curable cholesteric liquid crystal compound onto the other surface of the support.

(Material)

The materials usable for the production method of the present invention will be described. The production method of the present invention uses a curable cholesteric liquid crystal compound and a solvent (organic solvent). Moreover, in the production method of the present invention, the curable liquid crystal composition preferably contains at least a rod-shaped polymerizable cholesteric liquid crystal compound as the curable cholesteric liquid crystal compound, and contains an alignment-controlling agent and a solvent, from the viewpoint of obtaining excellent alignment. In addition, the curable liquid crystal composition preferably contains a chiral agent, from the viewpoint of making it possible to form a light-reflecting layer having a property of circularly polarizing light. Furthermore, in the production method of the present invention, the curable liquid crystal composition preferably contains a polymerization initiator.

(Curable Cholesteric Liquid Crystal Compound)

The curable liquid crystal composition used in the production method of the present invention contains the curable cholesteric liquid crystal compound. The curable cholesteric liquid crystal compound is preferably a polymerizable cholesteric liquid crystal compound. The curable cholesteric liquid crystal compound (polymerizable cholesteric liquid crystal compound) may be rod-shaped or disc-shaped, but preferably is rod-shaped.

Examples of the rod-shaped polymerizable cholesteric liquid crystal compound usable in the present invention include a rod-shaped nematic liquid crystal compound. Examples of the rod-shaped nematic liquid crystal compound include azomethines, azoxies, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenyl cyclohexyl benzonitriles. As the rod-shaped polymerizable cholesteric liquid crystal compound, not only a low molecular weight liquid crystal compound but also a high molecular weight liquid crystal compound can be used.

In the production method of the present invention, the curable liquid crystal composition shows a cholesteric liquid crystal phase, and the curable liquid crystal composition contains at least one kind of curable cholesteric liquid crystal compound.

The polymerizable cholesteric liquid crystal compound is obtained by introducing a polymerizable group to a cholesteric liquid crystal compound. Examples of the polymerizable group include an unsaturated polymerizable group, an epoxy group, and an aziridinyl group. Among these, an unsaturated polymerizable group is preferable, and an ethylenic unsaturated polymerizable group is particularly preferable. The polymerizable group can be introduced to a molecule of the cholesteric liquid crystal compound by various methods. The number of the polymerizable groups that the polymerizable cholesteric liquid crystal compound has is preferably 1 to 6, and more preferably 1 to 3. Examples of the polymerizable cholesteric liquid crystal compound include compounds disclosed in Makromol. Chem., Vol. 190, p. 2255 (1989); Advanced Materials Vol. 5, p. 107 (1993); U.S. Pat. Nos. 4,683,327A, 5,622,648A, and 5,770,107A; WO95/22586A, WO95/24455A, WO97/00600A, WO98/23580A, and WO98/52905A; JP1989-272551A (JP-H1-272551A), JP1994-16616A (JP-H6-16616A), JP1995-110469A (JP-H7-110469A), and JP1999-80081A (JP-H11-80081A); and JP2001-328973A. The production method of the present invention may concurrently use two or more kinds of polymerizable cholesteric liquid crystal compounds. If two or more kinds of polymerizable cholesteric liquid crystal compounds are concurrently used, temperature of alignment can be reduced.

The amount of the curable cholesteric liquid crystal compound added to the curable liquid crystal composition is preferably 10% by mass to 60% by mass, more preferably 20% by mass to 50% by mass, and particularly preferably 30% by mass to 40% by mass, based on the curable liquid crystal composition.

Chiral Agent (Optically Active Compound):

The curable liquid crystal composition shows a cholesteric liquid crystal phase, and for this, the composition preferably contains a chiral agent.

The chiral agent generally contains an asymmetric carbon atom. However, an axially asymmetric compound or a planarly asymmetric compound that does not contain an asymmetric carbon atom can also be used as the chiral agent. Examples of the axially asymmetric compound or planarly asymmetric compound include binaphthyl, helicene, paracyclophane, and a derivative thereof. The chiral agent may have a polymerizable group. When the chiral agent and the curable cholesteric liquid crystal compound have a polymerizable group, by a polymerization reaction between the polymerizable chiral agent and the polymerizable cholesteric liquid crystal compound, a polymer that has a repeating unit derived from the cholesteric liquid crystal compound and a repeating unit derived from the chiral agent can be formed. In this embodiment, the polymerizable group of the polymerizable chiral agent and the polymerizable group of the polymerizable cholesteric liquid crystal compound are preferably the same type of groups. Accordingly, the polymerizable group of the chiral agent is also preferably an unsaturated polymerizable group, an epoxy group, or an aziridinyl group, more preferably an unsaturated polymerizable group, and particularly preferably an ethylenic unsaturated polymerizable group.

The chiral agent may be a liquid crystal compound.

The amount of the chiral agent contained in the curable liquid crystal composition is preferably 1% by mass to 10% by mass, based on the curable cholesteric liquid crystal compound concurrently used.

(Organic Solvent)

The organic solvent that dissolves the curable cholesteric liquid crystal compound is not particularly limited, and known solvents can be used as the organic solvent. Examples of the organic solvent include ketones (acetone, 2-butanone, methyl isobutyl ketone, cyclohexanone, and the like), ethers (dioxane, tetrahydrofuran, and the like), aliphatic hydrocarbons (hexane and the like), alicyclic hydrocarbons (cyclohexane and the like), aromatic hydrocarbons (toluene, xylene, trimethylbenzene, and the like), halocarbons (dichloromethane, dichloroethane, dichlorobenzene, chlorotoluene, and the like), esters (methyl acetate, ethyl acetate, butyl acetate, and the like), water, alcohols (ethanol, isopropanol, butanol, cyclohexanol, and the like), cellosolves (methyl cellosolve, ethyl cellosolve, and the like), cellosolve acetates, sulfoxides (dimethyl sulfoxide and the like), and amides (dimethyl formamide, dimethyl acetamide, and the like).

In the production method of the present invention, one or two or more kinds of organic solvents can be used, and it is preferable to use two or more kinds of organic solvents.

(Alignment-Controlling Agent)

Preferable examples of the alignment-controlling agent usable in the production method of the present invention include compounds represented by the following Formulae (I) to (IV). Two or more kinds of compounds selected from these compounds may be concurrently used. These compounds can reduce a tilt angle of molecules of the cholesteric liquid crystal compound or can align the molecules substantially horizontally, in an air interface of the light-reflecting layer. In the present specification, the "horizontal alignment" means that a long axis direction of the liquid crystal molecules is in parallel with the film surface direction, but the alignment is not required to be strictly in a parallel state. In the present specification, the "horizontal alignment" refers to alignment in which a tilt angle formed between the film surface direction and the horizontal surface in the long axis direction of the liquid crystal molecules is less than 20°. When molecules of the liquid crystal compound are aligned horizontally near the air interface, defective alignment is not easily formed. Consequently, the transparency in the visible light region is heightened, and reflectance in the infrared region is increased. On the other hand, if the molecules of the liquid crystal compound are aligned at a tilt angle of a certain level or higher, a helical axis of the cholesteric liquid crystal phase deviates from a normal line of the film surface. Accordingly, the reflectance is decreased, or a fingerprint pattern is easily formed, which leads to a problem that the haze is increased, or that a diffraction property is exhibited.

[Chem. 1]

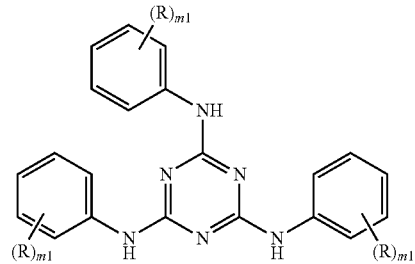

(I)

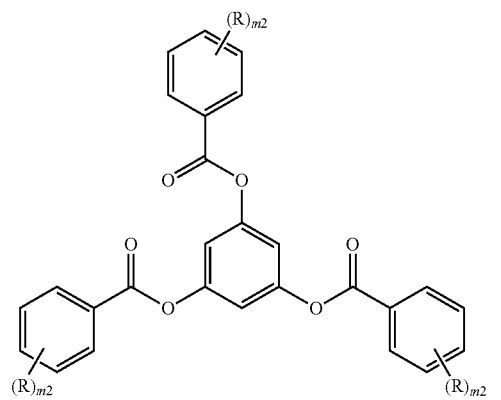

(II)

(III)

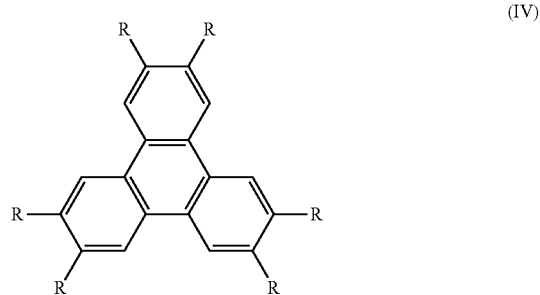

(IV)

In the above Formulae, each of Rs may be the same as or different from each other, and represents an alkoxy group having 1 to 30 carbon atoms that may be substituted with a fluorine atom. R is more preferably an alkoxy group having 1 to 20 carbon atoms, and even more preferably an alkoxy group having 1 to 15 carbon atoms. Here, in the alkoxy group, one or more $CH_2$s and two or more $CH_2$s which are not adjacent to each other may be substituted with —O—, —S—, —OCO—, —COO—, —NR$^a$—, —NR$^a$CO—, —CONR$^a$—, —NR$^a$SO$_2$—, or —SO$_2$NR$^a$—. R$^a$ represents a hydrogen atom or an alkyl group having 1 to 5 carbon atoms. If R$^a$ is substituted with one or more fluorine atoms, the alignment-controlling agent is localized at the air interface of the light-reflecting layer, and the alignment-controlling agent is easily eluted and diffused to the upper layer, which is thus preferable. Preferably, a terminal carbon atom of R is substituted with a fluorine atom, and more preferably, R has a perfluoroalkyl group on the terminal thereof.

Preferable examples of R include the following functional groups.

—$OC_nH_{2n+1}$
—$(OC_2H_4)_{n1}(CF_2)_{n2}F$
—$(OC_3H_6)_{n1}(CF_2)_{n2}F$
—$(OC_2H_4)_{n1}NR^aSO_2(CF_2)_{n2}F$
—$(OC_3H_6)_{n1}NR^aSO_2(CF_2)_{n2}F$

In the above formulae, each of n, n1, and n2 represents an integer of 1 or greater. n is preferably 1 to 20, and more preferably 5 to 15; n1 is preferably 1 to 10, and more preferably 1 to 5; and n2 is preferably 1 to 10, and more preferably 2 to 10.

In the above formulae, each of m1, m2, and m3 represents an integer of 1 or greater. m1 is preferably 1 or 2, and more preferably 2. When m1 is 1, R is preferably added at a para-position, and when m1 is 2, R is preferably added at a para-position and a meta-position.

m2 is preferably 1 or 2, and more preferably 1. When m2 is 1, R is preferably added at a para-position, and when m2 is 2, R is preferably added at a para-position and a meta-position.

m3 is preferably 1 to 3, and at this time, R is preferably added at two meta-positions and one para-position with respect to —COOH.

Examples of the compound of the Formula (I) include compounds exemplified in paragraphs [0092] and [0093] of JP2005-99248A.

Examples of the compound of the Formula (II) include compounds exemplified in paragraphs [0076] to [0078] and [0082] to [0085] of JP2002-129162A.

Examples of the compound of Formula (III) include compounds exemplified in paragraphs [0094] and [0095] of JP2005-99248A.

Examples of the compound of the Formula (IV) include compounds exemplified in paragraph [0096] in JP2005-99248A.

The amount of the alignment-controlling agent used is preferably 0.05% by mass to 20% by mass, and more preferably 0.1% by mass to 8% by mass, based on the curable cholesteric liquid crystal compound (solid content in a case of a coating liquid).

(Polymerization Initiator)

The curable liquid crystal composition preferably contains a polymerization initiator. In an embodiment in which a polymerization reaction is advanced by ultraviolet irradiation, the polymerization initiator to be used is preferably a polymerization initiator that can initiate the polymerization reaction by ultraviolet irradiation. Examples of the polymerization initiator include an α-carbonyl compound (disclosed in U.S. Pat. Nos. 2,367,661A and 2,367,670A), acyloin ether (disclosed in U.S. Pat. No. 2,448,828A), an α-hydrocarbon-substituted aromatic acyloin compound (disclosed in U.S. Pat. No. 2,722,512A), a polynuclear quinone compound (disclosed in U.S. Pat. Nos. 3,046,127A and 2,951,758A), a combination of a triarylimidazole dimer and p-aminophenyl ketone (disclosed in U.S. Pat. No. 3,549,367A), a compound of acridine and phenazine (disclosed in JP1985-105667A (JP-S60-105667A) and U.S. Pat. No. 4,239,850A), an oxadiazole compound (disclosed in U.S. Pat. No. 4,212,970A), and the like.

The amount of the polymerization initiator used is preferably 0.1% by mass to 20% by mass, and more preferably 1% by mass to 8% by mass, based on the curable cholesteric liquid crystal compound (solid content in a case of a coating liquid).

(Other Additives)

In order to improve the uniformity of alignment, coating suitability, and film strength, the liquid crystal composition may further contain at least one kind selected from various additives such as an unevenness-preventing agent, a cissing-preventing agent, an a polymerizable monomer, in addition to the above components. Moreover, the liquid crystal composition can optionally further contain a polymerization inhibitor, an antioxidant, an ultraviolet absorber, a photostabilizer, a colorant, fine metallic oxide particles, and the like, within a range that does not deteriorate the optical performance.

(Coating Method)

The curable liquid crystal composition is preferably prepared as a coating liquid that is obtained by dissolving and/or dispersing the composition components in the organic solvent. In the production method of the present invention, it is preferable to add a photopolymerization initiator to the curable liquid crystal composition.

In the step of coating of the present invention, after the curable liquid crystal composition is prepared as a coating liquid, the coating liquid is preferably coated onto, for example, the surface of the support such as a polymer film, a glass plate, or a quartz plate, or if necessary, the coating liquid is preferably coated onto the surface of an aligned film formed on a substrate. The curable liquid crystal composition can be coated by various methods such as a wire bar coating, extrusion coating, direct gravure coating, reverse gravure coating, and die coating.

(Step of Aligning)

The production method of the present invention includes a step of aligning the curable cholesteric liquid crystal compound to make a state of a cholesteric liquid crystal phase aligned by heating the curable liquid crystal composition coated onto one surface of the support.

In addition, after the step of coating, the production method of the present invention may include a step of drying the coated curable liquid crystal composition before or after the step of aligning. The step of drying may be performed at any timing. However, the step of drying is preferably performed after the step of coating, and more preferably performed after the step of coating before the step of aligning is performed. The step of drying can be performed by heating, air blowing, or other methods, without any limitation.

In the step of aligning, in order to create a cholesteric liquid crystal phase-transition temperature, the coated curable liquid crystal composition is heated. As the heating method, for example, the composition is temporarily heated to the temperature of an isotropic phase and then cooled to the cholesteric liquid crystal phase-transition temperature. In this manner, the state of the cholesteric liquid crystal phase can be stably formed. The liquid crystal phase-transition temperature of the curable liquid crystal composition is preferably in a range of from 10° C. to 250° C., and more preferably in a range of from 10° C. to 150° C., in respect of production suitability or the like. If the liquid crystal phase-transition temperature is 10° C. or higher, a temperature range in which the liquid crystal phase appears is easily set, and if the liquid crystal phase-transition temperature is 200° C. or lower, this temperature range is preferable from the viewpoint of heat energy consumption or the like. In addition, this temperature range is advantageous since the deformation, alteration, or the like of the support can be prevented.

In order to make a state of cholesteric liquid crystal phase by aligning the curable cholesteric liquid crystal compound, it is particularly preferable to heat the curable liquid crystal composition at 80° C. to 90° C. for 1.5 minutes to 5 minutes.

(Step of Irradiating)

The production method of the present invention includes a step (hereinafter, also referred to as a step of irradiating) in which the curable liquid crystal composition having undergone the step of aligning is cured by being irradiated with active radiation or the like so as to form a light-reflecting layer in which the cholesteric liquid crystal phase has been fixed.

As the active radiation, ultraviolet rays or the like can be used. In an embodiment using ultraviolet irradiation, a light source such as an ultraviolet lamp is used. In this step, due to the ultraviolet irradiation, the cholesteric liquid crystal phase is fixed, whereby the light-reflecting layer is formed.

The amount of energy of the active radiation irradiated is not particularly limited. Generally, the amount of energy is preferably approximately 100 mJ/cm$^2$ to 800 mJ/cm$^2$. In addition, the time for which the curable liquid crystal composition is irradiated with the active radiation is not particularly limited, and is determined from the viewpoints of both the sufficient strength and the productivity of the cured film (light-reflecting layer).

In order to promote the reaction for fixing the cholesteric liquid crystal phase, the active radiation may be irradiated under a heating condition. The temperature during the irradiation of active radiation is preferably maintained in a temperature range in which the cholesteric liquid crystal phase appears such that the cholesteric liquid crystal phase is not distorted. In addition, since the oxygen level in the curing reaction atmosphere is involved in the degree of polymerization, a desired degree of polymerization is not obtained from the curing reaction performed in the air, and the film strength becomes insufficient in some cases. In this case, it is preferable to reduce the oxygen level in the curing reaction atmosphere by a method such as nitrogen substitution. The oxygen level is preferably 10% by volume or less, more preferably 7% by volume or less, and most preferably 3% by volume or less.

In the step of irradiating, the cholesteric liquid crystal phase fixed, whereby the light-reflecting layer is formed. Herein, as the state where the liquid crystal phase "has been fixed", a state where the alignment of the liquid crystal compound that has been turned into the cholesteric liquid crystal phase is maintained is the most typical and a preferable embodiment, but the present invention is not limited to thereto. Specifically, the state refers to a state where the fixed alignment form can be stably maintained continuously, without showing fluidity of the light-reflecting layer, or without causing the change in the alignment form due to an external field or an external force, generally in a temperature range of from 0° C. to 50° C., or in a temperature range of from −30° C. to 70° C. under more severe conditions. In the present invention, the alignment state of the cholesteric liquid crystal phase is fixed by irradiation of active radiation.

In the present invention, it is sufficient for the optical characteristics of the cholesteric liquid crystal phase to be held in the light-reflecting layer, and the liquid crystal composition in the light-reflecting layer does not need to finally exhibit liquid crystallinity. For example, the liquid crystal composition may lose liquid crystallinity by becoming a high molecular weight composition due to a curing reaction.

(Step of Charging)

The production method of the present invention includes a step of charging the support and the light-reflecting layer with the same polarity. In addition, both the support and the light-reflecting layer may be charged positively or negatively in the present invention. The step of charging the support and the light-reflecting layer with the same polarity may be performed at any timing in the production method of the present invention. Alternatively, the support and the light-reflecting layer may be charged at different timings or at the same timing. In the production method of the present invention, the support and the light-reflecting layer may be charged once or a plurality of times. Here, when the production method of the present invention includes a step of winding up a laminate of the support and the light-reflecting layer, which will be described later, it is preferable to charge the support and the light-reflecting layer with the same polarity before the step of winding up, and to wind up the laminate while they are charged.

The step of charging the support and the light-reflecting layer with the same polarity is not particularly limited and may be performed by any methods. For example, both surfaces of the laminate of the support and the light-reflecting layer may be subjected to a step of bringing the surfaces into contact with a pass roll at least once, or at least one surface of the laminate of the support and the light-reflecting layer may be subjected to a step of being brought into contact with a charged pass roll. In addition, when the pass roll is not used, charging can be performed by a method such as corona discharge or charging brush.

Among the above steps, the production method of the present invention preferably includes a step of bringing both surfaces of the laminate of the support and the light-reflecting layer into contact with a pass roll at least once, or a step of bringing at least one surface of the laminate of the support and the light-reflecting layer into contact with a charged pass roll.

(Step of Bringing Both Surfaces of Laminate of Support and Light-reflecting Layer into Contact with a Pass Roll at Least Once)

First, a step of bringing both surfaces of the laminate of the support and the light-reflecting layer into contact with a pass roll at least once will be described. In this step, it is preferable to charge both surfaces of the laminate of the support and the light-reflecting layer, by static electricity generated from friction caused when the surfaces contact the pass roll. At this time, the pass roll preferably contains, on the surface thereof, a substance in a triboelectric series that shows an electrical polarity opposite to the electrical polarity of all of the surface of the support and the surface of the light-reflecting layer. Herein, from the viewpoint of liquid crystal alignment, the surface of the light-reflecting layer is preferably a cholesteric liquid crystal layer that does not contain impurities (inorganic particles and the like) other than the materials exemplified above as far as possible. When both surfaces of the laminate of the support and the light-reflecting layer are brought into contact with a pass roll at least once so as to charge the support and the light-reflecting layer with the same polarity, the surface of the light-reflecting layer becomes such a cholesteric liquid crystal layer, preferably by adjusting a combination of the material of the support surface and the material of the pass roll surface. Specifically, a triboelectric series of materials that are preferably used in the present invention is described in the following Table 1. Table 1 shows that when friction is caused between two arbitrary materials in the table, materials in the upper portion of the table tend to be more easily charged positively, and materials in the lower portion of the table tend to be more easily charged negatively.

TABLE 1

(+)
Glass
Curable cholesteric liquid crystal film
Matting agent (silica)-containing polyolefin film
Aluminum coating roll
Hard chrome-plated roll
Rubber roll
Polypropylene film
Surface-treated PET film
Acryl film
Urethane roll
Polyethylene film
(−)

In the Table 1, for example, when the support surface is a polyolefin film containing silica as a matting agent, if a rubber roll is used as the pass roll, by transporting the laminate while bringing the laminate into contact with the pass roll, both the support and the light-reflecting layer can be charged positively.

When both surfaces of the laminate of the support and the light-reflecting layer are brought into contact with the pass roll at least once, the surface and inside of the pass roll may use different materials. The material of the pass roll used in the production method of the present invention relates to the material of the support surface having a surface roughness of 4.5 nm to 25 nm, or to the triboelectric series of the liquid crystal layer (light-reflecting layer). However, if the pass roll surface is rubber, urethane, or a suitable metal used preferably in the triboelectric series, these materials are preferable since these are in positions of materials that can be easily charged with the same polarity as the light-reflecting layer in the triboelectric series. The pass roll is preferably a rubber roll, a urethane roll, or a roll in which at least the surface thereof is metal (for example, a hard chrome-plated roll or an aluminum coating roll), more preferably a rubber roll, a urethane roll, or an aluminum coating roll, particularly preferably a rubber roll or a urethane roll, and most preferably a urethane roll.

In the step of bringing both surfaces of the laminate of the support and the light-reflecting layer into contact with a pass roll at least once, the pass roll preferably rotates in the same direction as the transport direction of the laminate of the support and the light-reflecting layer, from the viewpoint of inhibiting scratches caused on the laminate surface (particularly, light-reflecting layer surface). In addition, the magnitude of charges respectively imparted to both surfaces of the laminate of the support and the light-reflecting layer is not particularly limited as long as the magnitude does not go against the purpose of the present invention.

(Step of Bringing at Least One Surface of Laminate of Support and Light-Reflecting Layer into Contact with Charged Pass Roll)

Next, the step of bringing at least one surface of the laminate of the support and the light-reflecting layer into contact with a charged pass roll will be described. If only the step of bringing both surfaces of the laminate of the support and the light-reflecting layer into contact with a pass roll at least once is performed, the support and the light-reflecting layer fail to be charged with the same polarity in some cases due to the trend of the triboelectric series of Table 1. On the other hand, according to the step of bringing at least one surface of the laminate of the support and the light-reflecting layer into contact with a charged pass roll, the support and the light-reflecting layer can be charged with the same polarity regardless of the surface material of the pass roll. For example, when a surface-treated PET film is used as a support (particularly, a support not including a matting agent-containing layer), this method can be employed in the production method of the present invention.

The method of using the charged pass roll is not particularly limited, and for example, the charged state of at least one surface of the laminate of the support and the light-reflecting layer can be controlled by the following method. That is, a method (disclosed in JP1994-348110A (JP-H6-348110A)) of bringing a charging roll for charging a photosensitive drum into direct contact with a support, or a method of bringing a metal roll that has been charged by being brought into contact with a charging roll into contact with a support can be exemplified.

In the method of using a charged pass roll, one surface of the laminate of the support and the light-reflecting layer may be charged with a specific electrical polarity by being brought into contact with the charged pass roll, and the other surface of the laminate of the support and the light-reflecting layer may be charged with the same electrical polarity by being brought into contact with another charged pass roll. This step may be used in combination with a step of bringing both surfaces of the laminate of the support and the light-reflecting layer into contact with the pass roll at least once. For example, charging the curable cholesteric liquid crystal phase positively by using static electricity generated from friction caused when the curable cholesteric liquid crystal phase is brought into contact with a rubber roll and charging the surface of the surface-treated PET film positively by bringing this PET film surface into contact with a charged pass roll can be used in combination.

The step of bringing at least one surface of the laminate of the support and the light-reflecting layer into contact with a charged pass roll may be performed using a pass roll in which the surface and the inside thereof are constituted with different materials. The pass roll surface is preferably a metal from the viewpoint of facilitating charging. The pass roll is more preferably a hard chrome-plated roll or an aluminum coating roll, and particularly preferably an aluminum coating roll.

(Step of Winding Up)

The production method of the present invention preferably includes a step of winding up the laminate of the support and the light-reflecting layer. In the production method of the present invention, the support and the light-reflecting layer are charged with the same polarity, so blocking does not easily occur even if the step of winding up is performed. In the production method of the present invention, the support and the light-reflecting layer charged in the step of charging the support and the light-reflecting layer with the same polarity are preferably held in the charged state at least until the step of winding up is completed. The support and the light-reflecting layer can be sufficiently charged by the above charging method. In addition, from the viewpoint of storing the film wound up, the charged state is preferably held for 36 hours, and more preferably for 72 hours, after the beginning of winding up.

(Step of Laminating)

When a plurality of the light-reflecting layers is laminated in the production method of the present invention, the step of winding up may be performed whenever one layer is laminated or performed after a plurality of layers is laminated. Among these, from the viewpoints of continuously producing the film at a low cost, the production method of the present invention preferably includes a step of repeating which includes the step of coating, the step of aligning, the step of irradiating, the step of charging, and the step of winding up after the light-reflective film that is wound up after being prepared through the above-described steps is fed out. That is, the production method of the present invention includes a step of repeating which includes the step of feeding out the light-reflective film wound up, the step of coating the curable liquid crystal composition that contains the curable cholesteric liquid crystal compound onto the surface of the light-reflecting layer of the support, the step of aligning the curable cholesteric liquid crystal compound to make a state of a cholesteric liquid crystal phase aligned by heating the coated curable liquid crystal composition, the step of irradiating in which a light-reflecting layer where the cholesteric liquid crystal phase has been fixed is formed by curing the curable liquid crystal composition, the step of charging the support and the light-reflecting layer with the same polarity, and the step of winding up a laminate of the support and the light-reflecting layer. The production method of the present invention preferably includes a step of laminating two or more (preferably three or more) light-reflecting layers by repeating the step of coating, the step of aligning, and the step of irradiating at least once while changing the type of the curable liquid crystal composition. Even when a laminate including three or more of the light-reflecting layers is obtained, the production method of the present invention can be preferably employed.

(Light-Reflective Film)

Next, the light-reflective film that can be produced by the method of producing a light-reflective film of the present invention will be described.

(Constitution)

Figure 4:
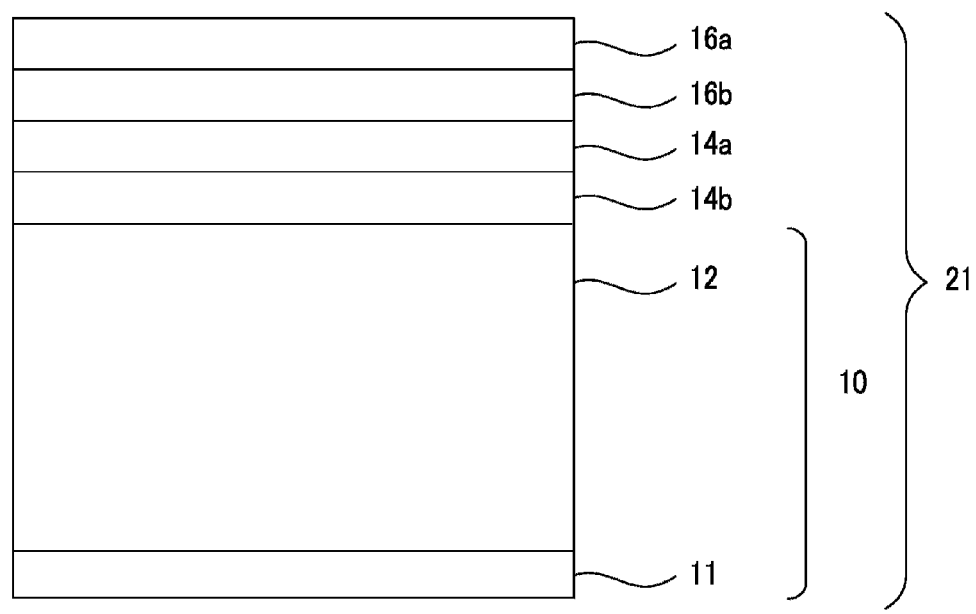
FIG. 4 is a schematic view showing the other exemplary cross-section of the infrared light-reflective film produced by the production method of the present invention.

An example of the light-reflective film produced by the production method of the present invention is shown in FIG. 4.

In a light-reflective film 21 shown in FIG. 4, a light-reflecting layer 14b in which the cholesteric liquid crystal phase has been fixed to form this layer is provided on one surface of a resin film 12. In addition, in the light-reflective film 21 shown in FIG. 4, light-reflecting layers 14a, 16b, and 16a in which the cholesteric liquid crystal phase has been fixed to form these layers are provided on the light-reflecting layer 14b. The light-reflective film produced by the production method of the present invention is not limited to these embodiments. For the light-reflective film, an embodiment in which three or more light-reflecting layers are formed is preferable, and an embodiment in which six or more light-reflecting layers are formed is more preferable.

In the light-reflective film 21 shown in FIG. 4, the cholesteric liquid crystal phase is fixed to each light-reflecting layer to form the layer. Accordingly, each of the light-reflecting layers shows selective light reflectivity reflecting light of a specific wavelength, based on the helical pitch of the cholesteric liquid crystal phase. For example, when adjacent light-reflecting layers (14a and 14b, and 16a and 16b) have almost the same degree of helical pitch and show optical rotation of opposite direction to each other, the light refection layers can reflect both left- and right-circularly polarized light with the same degree of wavelength, which is thus preferable. For example, as an example of the light-reflective film 21 in FIG. 4, the following example is given. In this example, among the light-reflecting layers 14a and 14b, the light-reflecting layer 14a is a liquid crystal composition containing a dextrorotatory chiral agent, the light-reflecting layer 14b is a liquid crystal composition containing a levorotatory chiral agent, and the light-reflecting layers 14a and 14b show almost the same degree of helical pitch (d 14 nm) (Condition Example 1).

As another example of the light-reflective film 21 in FIG. 4, the following example is given. In this example, the relationship between the light-reflecting layer 14a and the 14b is the same as in the above example of the light-reflective film 21 (the helical pitch of both the examples is d 14 nm), the light-reflecting layer 16a is a liquid crystal composition containing a dextrorotatory chiral agent, the light-reflecting layer 16b is a liquid crystal composition containing a levorotatory chiral agent, the light-reflecting layers 16a and 16b show almost the same degree of helical pitch (d 16 nm), and d 14≠d 16 (Condition Example 2). The light-reflective film 21 satisfying the (Condition Example 2) exerts the same effect as the example of the light-reflective film 21 of (Condition Example 1). Moreover, due to the light-reflecting layers 16a and 16b, the wavelength band of the reflected light widens, so the light-reflective film reflects light of a wide band. The light-reflecting layer is not limited to an embodiment in which even numbers of the layers are formed, and odd numbers of the light-reflecting layers may be formed.

The light-reflective film produced by the production method of the present invention shows a selective reflection characteristic based on the cholesteric liquid crystal phase of each light-reflecting layer. The light-reflective film may include light-reflecting layers in which all of a right-twisted and a left-twisted cholesteric liquid crystal phase have been fixed. If the light-reflective film includes each of the light-reflecting layers in which the right-twisted and the left-twisted cholesteric liquid crystal phases having the same helical pitch have been fixed, the selective reflectance to the light of a specific wavelength is heightened, which is thus preferable. In addition, if the light-reflective film includes a plurality of pairs of light-reflecting layers in which the right-twisted and the left-twisted cholesteric liquid crystal phases having the same helical pitch have been fixed, the selective reflectance is heightened, and selective reflection wavelength band can be widened, which is thus preferable.

The rotation direction of the cholesteric liquid crystal phase can be adjusted according to the type of the rod-shaped polymerizable cholesteric liquid crystal compound or the type of the chiral agent to be added, and the helical pitch can be adjusted according to the concentration of these materials.

(Thickness)

When the light-reflective film is a laminate including two or more light-reflecting layers, the total thickness of the light-reflective film is not particularly limited. However, in an embodiment in which the light-reflective film includes four or more light-reflecting layers in which the cholesteric liquid crystal phase has been fixed and shows the light reflection characteristic over a wide infrared reflection region, that is, in an embodiment in which the light-reflective film shows a heat-shielding property, the thickness of each light-reflecting layer may be approximately 3 μm to 6 μm, and the total thickness of the light-reflective film may be approximately 15 μm to 40 μm.

(Reflection Wavelength)

The production method of the present invention relates to a method of producing a light-reflective film. It is known that the wavelength in a specific range that the light-reflective film reflects can be shifted according to various factors of the production method. For example, a wavelength region that can be reflected can be shifted by changing conditions such as the amount of a chiral agent added, the temperature at the time of fixing the cholesteric liquid crystal phase, illumination intensity, and irradiation time.

The method of producing a light-reflective film of the present invention can be more preferably used in producing an infrared light-reflective film that reflects infrared light of 800 nm or greater.

The production method of the present invention can be preferably used in producing an infrared light-reflective film that has a central reflection wavelength at 950 nm to 2000 nm, and can be more preferably used in producing an infrared light-reflective film that has a central reflection wavelength at 950 nm to 1400 nm.

The wavelength that one light-reflecting layer (or each light-reflecting layer when the light-reflective film includes a plurality of light-reflecting layers) of the light-reflective film selectively reflects is not particularly limited. By adjusting the helical pitch of the cholesteric liquid crystal phase according to the use, the reflection characteristic with respect to the light of a desired wavelength can be imparted to the light-reflective film. For example, an infrared light-reflecting film is exemplified in which at least one light-reflecting layer is a so-called infrared light-reflecting film that reflects a portion of light in an infrared light wavelength band of a wavelength of 800 nm to 2000. This infrared light-reflecting film shows the heat-shielding property.

(Reflectance)

Another example of the light-reflective film produced by the production method of the present invention includes a light-reflective film that can reflect 75% or more (preferably 80% or more, and more preferably 90% or more) of sunlight of a wavelength of 900 nm to 1160 nm. If a window film is prepared using a light-reflective film satisfying this performance, a high heat-shielding performance showing a shading coefficient specified by JIS A 5759 (film for window glass of building) of 0.7 or less can be achieved.

When the cholesteric liquid crystal phase is fixed, only one of the right-circularly polarized light component and the left-circularly polarized light component is fixed to one layer. Consequently, the light-reflective film including one light-reflecting layer shows 50% of a light reflection performance to the maximum. Therefore, by coating a layer reflecting a right-circularly polarized light onto a layer reflecting a left-circularly polarized light in layers, the light reflection performance can be heightened to 100% to the maximum. The width of the reflection wavelength band is 100 nm to 150 nm in general. However, by using a material that increases a birefringence $\Delta n$ of the cholesteric liquid crystal layer, or varying the concentration distribution of the chiral agent in the cross-section direction of the layer (direction toward the support from the cholesteric liquid crystal phase) inside the prepared light-reflecting layer, the reflected band can be widened to approximately 150 nm to 300 nm.

(Haze)

The light-reflective film produced by the production method of the present invention can reduce haze, and specifically, the haze of the light-reflective film can be reduced to less than 0.9%. The haze of the light-reflective film is preferably 0.6% or less, more preferably 0.5% or less, and particularly preferably 0.3% or less.

The light-reflective film used by being attached to windows or the like is required to be transparent, and the lower the haze, the more preferable. The haze can be measured based on JIS K 7136:2000 (method of measuring haze of plastic transparent materials).

(Form)

It does not matter if the light-reflective film produced by the production method of the present invention is in the form of being spread in a sheet shape or in the form of being wound up in a roll shape. However, the light-reflective film is preferably wound up in a roll shape. During the production process of the light-reflective film, when the light-reflective film is repeatedly wound up and fed out, blocking is inhibited. Accordingly, excellent optical characteristics can be maintained. In addition, even if the light-reflective film is stored and transported while being wound up in a roll shape after being produced, the blocking can be inhibited, so excellent optical characteristics can be maintained.

The light-reflective film itself produced by the production method of the present invention may be either a member having a self-supporting property that can be used as a window material or a member not having a self-supporting property and being used by being stuck to a support such as a glass plate having a self-supporting property.

(Use)

The use of the light-reflective film produced by the production method of the present invention is not particularly limited, but the film is preferably an infrared light-reflective film for windows.

The light-reflective film produced by the production method of the present invention may also be used by being stuck to the surface of a glass plate, a plastic support, or the like. In this embodiment, the surface of the light-reflective film to be stuck to the glass plate or the like is preferably adhesive. In the present embodiment, the light-reflective film produced by the production method of the present invention preferably has an adhesive layer, an easy adhesion layer, and the like that can be stuck to the surface of a support such as a glass plate. Needless to say, the non-adhesive light-reflective film not having the adhesiveness or an easy adhesion layer may be stuck to the surface of a glass plate by using an adhesive.

The light-reflective film produced by the production method of the present invention preferably exhibits a heat-shielding property against sunlight, and more preferably efficiently reflects 700 nm or greater of infrared of sunlight.

The light-reflective film produced by the production method of the present invention can be used as a heat-shielding window itself for vehicles or buildings, or as a sheet or a film used for windows for vehicles or buildings for the purpose of imparting a heat-shielding property. In addition, the light-reflective film can be used as a showcase of a freezer, a material for agricultural greenhouses, a reflective sheet for agriculture, a film for solar cells, and the like. Among these, the light-reflective film produced by the production method of the present invention is preferably used as an infrared-reflective film for windows, from the viewpoint of characteristics including a high visible light transmittance and low haze.

The light-reflective film produced by the production method of the present invention may also be used as a heat-shielding member by being incorporated into a laminated glass.

The heat-shielding member may attached to windows of houses, constructions such as office buildings, or vehicles such as automobiles, and as an insulation member for heat-shielding. The light-reflective film itself can be used as an insulation member for heat-shielding (for example, a heat-shielding glass or heat-shielding film).

EXAMPLES

Hereinbelow, the characteristics of the present invention will be described in more detail based on examples and comparative examples (comparative examples are not regarded as techniques known in the related art). The materials, used amount, ratio, the content of treatment, treatment order, and the like shown in the following examples can be appropriately changed as long as the change does not depart from the purpose of the present invention. Therefore, the scope of the present invention is not limitedly interpreted by the following specific examples.

Example 1

1. Production of Light-Reflective Film (Support)

As a resin film, a polyethylene terephthalate film (PET, manufactured by FUJIFILM Corporation) having a thickness of 75 μm was used.

In Example 1, an inorganic particle-containing layer that contains a matting agent was prepared by the following method and provided on one surface of the PET film.

An aqueous latex dispersion having the composition shown in Table 2 was coated onto one surface of the PET by using a die coater so as to yield a dried film thickness of 1.0 μm. The resultant was dried at 185° C. for 3 minutes, thereby forming an inorganic fine particle-containing layer.

TABLE 2

| Material (type) | Material name (manufacturer) | Formulation amount |
|---|---|---|
| Silica dispersion | SNOWTEX C (manufactured by NISSAN CHEMICAL INDUSTRIES, LTD.) | 4 parts by mass |
| Polyolefin-based polymer | Chemipearl S-120, 27% by mass (manufactured by Mitsui Petrochemical Industries Ltd) | 15 parts by mass |
| Surfactant | Megafac F-444 (manufactured by DIC Corporation) | 0.1 parts by mass |
| Epoxy compound | Denacol EX-614B (manufactured by Nagase Kasei Kogyo Co., Ltd.) | 0.6 parts by mass |
| Solvent | Water | Prepared to yield 100 parts by mass in total |

(Preparation of Coating Liquid (Curable Liquid Crystal Composition))

Coating liquids having compositions shown in Tables 3 and 4 were prepared respectively.

TABLE 3

Composition of Coating Liquid (A): Right-circularly Polarized Light-Reflecting Layer

| Material (type) | Material name (manufacturer) | Formulation amount |
|---|---|---|
| Curable cholesteric liquid crystal compound (rod-shaped polymerizable cholesteric liquid crystal compound) | RM-257 (Merck) | 10.000 parts by mass |
| Chiral agent | LC-756 (BASF) | Adjusted according to target reflection wavelength |
| Polymerization initiator | Irg-819 (Ciba Specialty Chemicals) | 0.419 parts by mass |
| Alignment-controlling agent | Compound 1 shown below | 0.016 parts by mass |
| Solvent | 2-Butanone (Wako Pure Chemical Industries, Ltd) | 15.652 parts by mass |

TABLE 4

Composition of Coating Liquid (B): Left-circularly Polarized Light-Reflecting Layer

| Material (type) | Material name (manufacturer) | Formulation amount |
|---|---|---|
| Curable cholesteric liquid crystal compound (rod-shaped polymerizable cholesteric liquid crystal compound) | RM-257 (Merck) | 10.000 parts by mass |
| Chiral agent | Compound 2 shown below | Adjusted according to target reflection wavelength |
| Polymerization initiator | Irg-819 (Ciba Specialty Chemicals) | 0.419 parts by mass |
| Alignment-controlling agent | Compound 1 shown below | 0.016 parts by mass |
| Solvent | 2-Butanone (Wako Pure Chemical Industries, Ltd) | 15.652 parts by mass |

Alignment-Controlling Agent: Compound 1 (Compound Disclosed in JP2005-99248A)

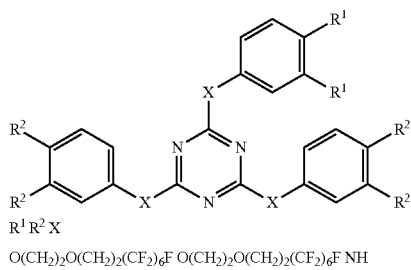

$R^1 R^2 X$ $O(CH_2)_2O(CH_2)_2(CF_2)_6F \quad O(CH_2)_2O(CH_2)_2(CF_2)_6F \quad NH$ TABLE 4-continued Composition of Coating Liquid (B): Left-circularly Polarized Light-Reflecting Layer

| Material (type) | Material name (manufacturer) | Formulation amount |
|---|---|---|

Chiral Agent: Compound 2 (Compound Disclosed in JP2002-179668A)

The coating liquids used for forming respective light-reflecting layers are summarized in Table 5. In addition, the reflection characteristics and peaks of reflection wavelengths of the respective light-reflecting layers are also summarized in the table.

TABLE 5

| Layer No. | Reflection characteristic | Material | Peak of reflection wavelength |
|---|---|---|---|
| 1 | Right-circularly polarized light-reflecting layer | Coating liquid (A) in which concentration of chiral agent is adjusted | 900 nm |
| 2 | Right-circularly polarized light-reflecting layer | Coating liquid (A) in which concentration of chiral agent is adjusted | 1030 nm |
| 3 | Right-circularly polarized light-reflecting layer | Coating liquid (A) in which concentration of chiral agent is adjusted | 1160 nm |
| 4 | Left-circularly polarized light-reflecting layer | Coating liquid (B) in which concentration of chiral agent is adjusted | 900 nm |
| 5 | Left-circularly polarized light-reflecting layer | Coating liquid (B) in which concentration of chiral agent is adjusted | 1030 nm |
| 6 | Left-circularly polarized light-reflecting layer | Coating liquid (B) in which concentration of chiral agent is adjusted | 1160 nm |

A light-reflective film of Example 1 was produced under the following conditions by using a production apparatus shown in FIG. 1.

A support 10 obtained by providing a matting agent-containing layer 11 to one surface (back surface) of a PET film 12 was fed out of a feeding portion 31;

the coating liquid for the first light-reflecting layer prepared as described above was coated at room temperature onto the other surface of the support 10 where the matting agent-containing layer 11 was not provided, by using a die coater 33, such that the film thickness after drying became approximately 4 μm to 5 μm;

the obtained film was dried at room temperature for 30 seconds in a drying portion 34 and then aged in an atmosphere at 85° C. for 4 minutes in an aging portion 35 so as to align the curable cholesteric liquid crystal compound contained in the coating liquid, thereby forming a cholesteric liquid crystal phase;

then the film was subjected to UV irradiation at 30° C. in a UV irradiation portion 36 while adjusting an output power of UV irradiation with a metal halide lamp manufactured by EYE GRAPHICS Co., Ltd. so as to fix the cholesteric liquid crystal phase, whereby a light-reflective film 21 in which the first light-reflecting layer (lower layer) 14b was provided on the support 10 was prepared.

While the prepared light-reflective film 21 was transported, aluminum-coated pass rolls 38 each of which had been installed for each surface of the light-reflective film 21 immediately before a winding up portion 37 were brought into contact with the light-reflective film 21 at 25° C., thereby charging the support 10 and the first light-reflecting layer 14b by using friction caused between the pass roll and each of the support and the first light-reflecting layer 14b.

The light-reflective film having been brought into contact with the pass rolls 38 was passed through a charge meter 39 and then wound up in the winding up portion 37.

The light-reflective film 21 wound up was mounted on the feeding portion 31. While the coating liquid was changed to a coating liquid for the next light-reflecting layer, the step of coating, the step of aligning, the step of curing, the step of charging, and the step of winding up were repeated, thereby forming the second to sixth light-reflecting layers.

Figure 3:
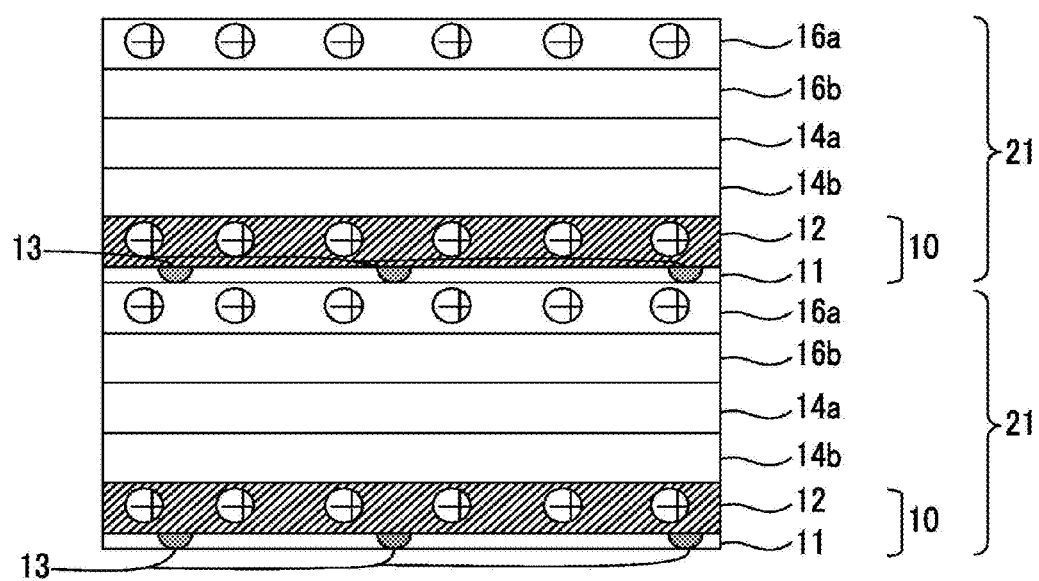
FIG. 3 is a schematic view showing another exemplary cross-section of the infrared light-reflective film produced by the production method of the present invention.

Herein, a cross-sectional view of the light-reflective film 21 in which the first to fourth light-reflecting layers have been laminated is shown in FIG. 4, and a schematic view showing a state where the wound up light-reflective film 21 has been laminated is shown in FIG. 3. In the production method of the present invention, even when the light-reflective film having a plurality of light-reflecting layers is laminated, both the matting agent-containing layer 11 and the fourth light-reflecting layer are charged positively. In addition, due to electrical repulsion between two sheets of light-reflective films and appropriate asperities on the surface of the matting agent-containing layer 11, contact between films can be inhibited, so blocking can be inhibited.

The light-reflective film in which the first to sixth light-reflecting layers have been laminated in order was wound up, and the obtained light-reflective film was named a light-reflective film of Example 1.

Examples 2 to 8, and Comparative Examples 1 to 8

Light-reflective films of respective examples and comparative examples were produced in the same manner as in Example 1, except that the type of the back surface of the support, the surface roughness Ra, and the material of the pass roll were changed as described in Table 6.

Here, in Examples 2 and 3 and Comparative Example 1 and 2, the amounts of a matting agent contained were set to 10 parts by mass, 15 parts by mass, 2 parts by mass, and 20 parts by mass respectively to control the surface roughness of the matting agent-containing film. In addition, in Examples 4 and 5 Comparative Examples 3 to 6, instead of providing the matting agent-containing film, the microwave plasma treatment was performed on the back surface of PET, thereby controlling the surface roughness Ra to the values described in Table 6. The conditions of the microwave plasma treatment were as follows in, for example, Example 4.

The surface roughness was controlled by the following conditions.

Apparatus: BH-10 (NISSIN. Inc),
Frequency: 2.45 GHz,
Output power: 1000 W,
Treatment time: 1 minute,
Process gas: $N_2$.

In the triboelectric series described in Table 1, in Examples 1 to 3 and Comparative Examples 1 to 4, by simply bringing the light-reflective film 21 into contact with the pass roll in the constitution described in Table 5, each of both surfaces of the light-reflective film 21 could be charged with the charge amount described in Table 5. Meanwhile, if the surface-treated PET film is brought into contact with the aluminum-coated pass roll, the film is generally charged negatively. Therefore, in Example 4 and Comparative Example 5, by imposing positive charge on the pass roll at the back surface side of the support, the back surface of the support 10 was positively charged. In addition, if the light-reflecting layer in which the cholesteric liquid crystal phase has been fixed is brought into contact with the aluminum-coated pass roll, the light-reflecting layer is generally charged positively. Therefore, in Example 5 and Comparative Example 6, by imposing negative charge on the pass roll at the light-reflecting layer side of the support, the surface of the light-reflecting layer side of the support 10 was negatively charged. In Examples 6 to 8 and Comparative Examples 7 and 8, the material of the pass roll was changed to rubber or urethane as described in Table 6, and charging was performed as the embodiment described in Table 6.

2. Evaluation of Light-Reflective Film

The prepared light-reflective films of the respective examples and comparative examples were evaluated in terms of the following items.

(1) Charge Amount:

When the light-reflective films of the respective examples and comparative examples were produced, the amount of charge stored in the light-reflective film 21 having contacted a pass roll 38 was measured at a position 1 m before the winding up portion. The charge amount was measured at a position 50 mm distant from the back surface of the support 10 and from the sixth light-reflecting layer as an outermost layer, by using a charge meter (manufactured by KASUGA ELECTRIC WORKS LTD., product name KSD-0108).

(2) Surface Roughness (Ra):

The light-reflective films of the respective examples and comparative examples were unwound and cut to 200 μm×200 μm. The surface of the film was measured using AFM (manufactured by KEYENCE Corporation, product name VN-8000), based on JIS B 0601:2001.

(3) Reflectance:

The heat-shielding performance was measured as a solar reflectance of a coating film, based on a (generally used) method that calculates the reflectance based on a calculation method disclosed in JIS R 316:1998 "Method of testing transmittance, reflectance, emissivity, and a solar radiation acquisition rate of glass plates".

In order to measure the reflectance, the light-reflective films of the respective examples and comparative examples were unwound and cut to 200 μm×200 μm, and a spectrophotometer equipped with an integrating sphere accessory device was used. The reflectance at a wavelength of 900 nm to 1160 nm is shown in Table 6.

(4) Haze:

If the alignment of the cholesteric liquid crystal layer deteriorates, not only the reflectance deteriorates, but also the haze is markedly increased. In order to evaluate the alignment performance of the cholesteric liquid crystal layer, the haze was measured. In addition, the haze was also measured and evaluated in regard to transparency of the matting agent-containing film.

In order to measure the haze, the light-reflective films of the respective examples and comparative examples were unwound and cut to 200 μm×200 μm, and the haze was measured based on JIS K 7136:2000 (method of measuring haze of plastic transparent materials).

The results obtained from the measurement are shown in Table 6.

TABLE 6

| | Back surface of support | | | Evaluation | | | |
|---|---|---|---|---|---|---|---|
| | | | | Charge amount of light-reflective film at the time of contacting pass roll | | | |
| | | Surface | | [kV] | | | |
| | Type | roughness Ra [nm] | Material of pass roll | Liquid crystal side | Back surface side | Reflectance (%)*1 | Haze (%)*2 |
| Example 1 | Matting agent-containing film | 6.1 | Aluminum | 6.4 | 8.7 | 92 | 0.43 (0.31) |
| Example 2 | Matting agent-containing film | 15 | | 6.7 | 6.7 | 93 | 0.45 (0.29) |
| Example 3 | Matting agent-containing film | 20.2 | | 6.1 | 4.3 | 93 | 0.51 (0.3) |
| Comparative Example 1 | Matting agent-containing film | 4.3 | | 6.3 | 10.3 | 73 | 1.43 (1.32) |
| Comparative Example 2 | Matting agent-containing film | 30.5 | | 6.2 | 2.1 | 92 | 1.05 (0.3) |

TABLE 6-continued

| | Back surface of support | | | Evaluation | | | |
|---|---|---|---|---|---|---|---|
| | | | | Charge amount of light-reflective film at the time of contacting pass roll | | | |
| | | Surface | | [kV] | | | |
| | Type | roughness Ra [nm] | Material of pass roll | Liquid crystal side | Back surface side | Reflectance (%)*1 | Haze (%)*2 |
| Comparative Example 3 | PET | 3.2 | | 6.5 | −8.5 | 65 | 1.88 (1.78) |
| Comparative Example 4 | PET | 15.4 | | 6.1 | −5.8 | 71 | 0.96 (0.8) |
| Comparative Example 5 | PET | 3.1 | Positively charged | 6.3 | 6.1 | 66 | 1.40 (1.3) |
| Example 4 | PET | 15.1 | roll | 6.2 | 6.3 | 93 | 0.46 (0.30) |
| Comparative Example 6 | PET | 3.1 | Negatively charged | −6.1 | −5.2 | 64 | 1.71 (1.6) |
| Example 5 | PET | 15.6 | roll | −5.7 | −5.4 | 92 | 0.47 (0.31) |
| Example 6 | Matting agent-containing film | 6.4 | Rubber | 11.4 | 9.4 | 93 | 0.44 (0.32) |
| Example 7 | Matting agent-containing film | 21.2 | | 11.7 | 8.1 | 94 | 0.45 (0.30) |
| Comparative Example 8 | Matting agent-containing film | 4.0 | | 11.1 | 9.9 | 70 | 1.40 (1.29) |
| Comparative Example 7 | Matting agent-containing film | 31.2 | | 11.3 | 6.8 | 93 | 1.12 (0.31) |
| Example 8 | PET | 15.3 | Urethane | 10.9 | 4.2 | 93 | 0.47 (0.32) |

In Table 6, *1 represents the reflectance to light of a wavelength of 900 nm to 1160 nm. If the reflectance is 75% or more, this means that the film satisfies the performance of a light-reflective film. If the reflectance is less than 75%, this means that the film does not satisfy the performance of a light-reflective film.

*2 represents the haze of a light-reflective film. If the haze of a light-reflective film is 0.9% or less, this means "high transparency, which is at a level usable as a film for windows". If the haze of a light-reflective film exceeds 0.9%, this means that "whitishness caused by (mainly internal) scattering is observed and transparency is insufficient, which is at a level not usable as a film for windows". In Table 6, in the column of the haze of the light-reflective film, the value of haze of the light-reflective film is tabulated, and below this value, the value of haze of only the light-reflecting layer is included in parentheses.

From Table 6, it could be understood that all of the light-reflective films of the present invention showed excellent reflectance and small haze.

On the other hand, from Comparative Examples 1, 3, 5, and 6, it could be understood that both the reflectance and the haze deteriorated if the surface roughness of the support fell short of the range specified by the present invention. In addition, from Comparative Example 2, it could be understood that the haze deteriorated if the surface roughness of the support exceeded the range specified by the present invention. Moreover, from Comparative Example 4, it could be understood that both the reflectance and the haze deteriorated if the polarity of the surface charge of the support was opposite to that of the light-reflecting layer.

Example 9

The light-reflective film obtained in Example 1 was wound up in a roll shape and allowed to stand as it was for 120 minutes. Thereafter, while this film was in a roll state, a charge meter was placed in the film at a position 50 mm distant from the outermost layer of the roll, thereby measuring the charge amount of the light-reflective film. As a result, it could be understood that the light-reflective film sufficiently held the charged state.

What is claimed is:

1. A method of producing a light-reflective film including:
    a step of coating a curable liquid crystal composition that contains a curable cholesteric liquid crystal compound onto one surface of a support of which a surface roughness Ra of the other surface of the support is 4.5 nm to 25 nm;
    a step of aligning the curable cholesteric liquid crystal compound to make a state of a cholesteric liquid crystal phase aligned by heating the coated curable liquid crystal composition;
    a step of irradiating in which a light-reflecting layer being formed the cholesteric liquid crystal phase is fixed by advancing a curing reaction of the curable liquid crystal composition; and
    a step of charging the support and the light-reflecting layer with the same polarity.

2. The method of producing a light-reflective film according to claim 1, further including a step of winding up a laminate of the support and the light-reflecting layer.

3. The method of producing a light-reflective film according to claim 1,
wherein the step of charging the support and the light-reflecting layer with the same polarity includes a step of bringing both surfaces of the laminate of the support and the light-reflecting layer into contact with a pass roll at least once.

4. The method of producing a light-reflective film according to claim 2,
wherein the step of charging the support and the light-reflecting layer with the same polarity includes a step of bringing both surfaces of the laminate of the support and the light-reflecting layer into contact with a pass roll at least once.

5. The method of producing a light-reflective film according to claim 3,
wherein the pass roll contains, on the surface of the pass roll, a material in a triboelectric series that shows an electrical polarity opposite to the electrical polarity of both the support and the light-reflecting layer.

6. The method of producing a light-reflective film according to claim 1,
wherein the step of charging the support and the light-reflecting layer with the same polarity includes a step of bringing at least one surface of the laminate of the support and the light-reflecting layer into contact with a charged pass roll.

7. The method of producing a light-reflective film according to claim 2,
wherein the step of charging the support and the light-reflecting layer with the same polarity includes a step of bringing at least one surface of the laminate of the support and the light-reflecting layer into contact with a charged pass roll.

8. The method of producing a light-reflective film according to claim 3,
wherein the pass roll is a rubber roll, a urethane roll, a hard chrome-plated roll, or an aluminum coating roll.

9. The method of producing a light-reflective film according to claim 4,
wherein the pass roll is a rubber roll, a urethane roll, a hard chrome-plated roll, or an aluminum coating roll.

10. The method of producing a light-reflective film according to claim 6,
wherein the pass roll is a hard chrome-plated roll or an aluminum coating roll.

11. The method of producing a light-reflective film according to claim 7,
wherein the pass roll is a hard chrome-plated roll or an aluminum coating roll.

12. The method of producing a light-reflective film according to claim 2, in which a set of steps is repeated, wherein the set of steps comprising:
a step of feeding out the light-reflective film obtained after the step of winding up according to claim 2,
the step of coating the curable liquid crystal composition that contains the curable cholesteric liquid crystal compound onto the surface of the light-reflecting layer,
the step of aligning the curable cholesteric liquid crystal compound to make a state of a cholesteric liquid crystal phase aligned by heating the coated curable liquid crystal composition,
the step of irradiating in which the light-reflecting layer where the cholesteric liquid crystal phase has been fixed is formed by advancing a curing reaction of the curable liquid crystal composition,
the step of charging the support and the light-reflecting layer with the same polarity, and
the step of winding up a laminate of the support and the light-reflecting layer.

13. The method of producing a light-reflective film according to claim 1,
wherein the curable liquid crystal composition contains at least a rod-shaped polymerizable cholesteric liquid crystal compound as the curable cholesteric liquid crystal compound, and contains an alignment-controlling agent, a solvent, and a chiral agent.

14. The method of producing a light-reflective film according to claim 12,
wherein at least one layer that reflects right-circularly polarized light and at least one layer that reflects left-circularly polarized light are formed respectively as the light-reflecting layer.

15. The method of producing a light-reflective film according to claim 1,
wherein the support contains a polyethylene terephthalate film.

16. The method of producing a light-reflective film according to claim 1,
wherein the surface roughness of the other surface of the support is controlled to 4.5 nm to 25 nm by laminating a matting agent-containing layer, a microwave plasma treatment, or kneading the matting agent into the support.

17. The method of producing a light-reflective film according to claim 16,
wherein the amount of the matting agent added to the support is 15% by mass or less.

18. The method of producing a light-reflective film according to claim 1, which is a method of producing a light-reflective film for being attached to a window or for laminated glass.

* * * * *